Patented June 25, 1940

2,205,949

UNITED STATES PATENT OFFICE 2,205,949

ALKYL HYDROXY AROMATIC SULPHONATES

Anthony M. Schwartz, Buffalo, N. Y., assignor to National Aniline & Chemical Company, Inc., New York, N. Y., a corporation of New York No Drawing. Application September 26, 1933, Serial No. 691,088

27 Claims. (Cl. 260—512)

This invention relates to a new class of sulphonated aromatic compounds. It relates more particularly to a new class of sulphonated aromatic compounds wherein a long-chain alkyl group is directly attached to the aromatic nucleus.

The sulphonated aromatic compounds of the present invention comprise compounds which correspond with the general formula AHRS; wherein A represents an aromatic nucleus which may contain substituents; H represents a nuclear hydroxyl group; R represents a nuclear alkyl group containing at least 9 carbon atoms, and preferably 9 to 11 carbon atoms; and S represents a nuclear sulphonic acid group in the form of the free acid or a salt. As employed in the specification and claims, the term "nuclear," when applied to a radical or group, means that the radical or group is directly linked to a carbon atom of the aromatic nucleus represented by A in the foregoing formula. For convenience the sulphonated aromatic compounds of the type AHRS will be referred to in the specification and the claims as "alkyl hydroxy aromatic sulphonates," which term generically includes said compounds, in the form of the free sulphonic acids and of the salts of the sulphonic acids. The said sulphonated aromatic compounds may be employed either in the form of the free acids of their salts, as wetting, impregnating, dispersing, assisting and penetrating agents.

The said sulphonated aromatic compounds include products in which the aromatic nucleus represented by A in the foregoing formula is derived from a carbocyclic or a heterocyclic, mononuclear or polynuclear aromatic compound. The aromatic nucleus represented by A may be free from further substituents, or it may contain one or more additional atoms or groups attached to the carbon or other atoms of the nucleus; as for example any alkyl, aryl, hydroaryl, alkaryl or aralkyl group (including saturated and unsaturated open-chain or cyclic groups), and particularly one or more additional alkyl groups of the type represented by R in the foregoing formula, which may be the same or different; and/or one or more additional sulphonic acid radicals (either in the acid or salt form) besides that represented by S in the foregoing formula. The nuclear alkyl group represented by R in the foregoing formula may be saturated or unsaturated, may contain a straight or branched carbon chain and may be linked to a carbon atom of the aromatic nucleus through a carbon atom standing at an end of the alkyl carbon chain or at an intermediate point in said carbon chain. It may consist solely of carbon and hydrogen (a hydrocarbon chain), or it may contain substituent atoms or groups linked to one or more of the carbon atoms of the alkyl radical.

The group represented by S in the foregoing formula may be in the form of the free sulphonic acid or in the form of a salt; for example, a salt resulting either from the replacement of the hydrogen of said sulphonic acid group with its equivalent of a metal (preferably an alkali metal) or from the addition of ammonia or an organic base.

It is to be understood that the invention includes products containing a plurality of aromatic nuclei linked together by an organic or inorganic atom or radical, at least one of which aromatic nuclei contains as nuclear substituents radicals of the type S, H, and R (as defined above). Thus the invention comprehends compounds of the type AHRS—Q—AHRS, wherein Q represents an alkylene group (as for example —CH₂—, —CH₂CH₂—, etc.). The invention furthermore includes compounds of the type AHRSO₃Z, wherein Z represents a polyvalent metal or organic basic radical which links the grouping AHRSO₃ through the sulphonic acid group to another similar grouping or a different acid compound. Examples of the latter type of compound are (AHRSO₃)₂Mg,

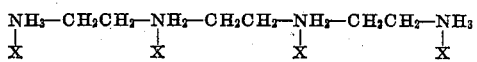

and

NH₃—CH₂CH₂—NH₂—CH₂CH₂—NH₂—CH₂CH₂—NH₃
  |             |             |             |
 X          X         X         X (wherein X represents a radical containing an acid group at least one of which is the radical AHRSO₃H), A, H and R having the meaning above defined.

The sulphonated aromatic compounds employed in accordance with the present invention may be prepared in various ways. According to one method of preparation, an alkyl hydroxy aromatic compound of the type AHR (in which the symbols A, H, and R have the meaning defined above) may be treated with a sulphonating agent, in the presence or absence of an inert organic solvent or diluent, and in the presence or absence of a sulphonation assistant. As sulphonating agents there may be employed sulphuric acids of various strengths (e. g., 66° Bé. sulphuric acid, sulphuric acid monohydrate, oleum), chlorsulphonic acid, etc. As solvents or diluents there may be employed halogenated hydrocarbons of the aliphatic and aromatic series, as for example, carbon tetrachloride, dichlorethane, tetrachlorethane, dichlorbenzene, etc. When an inert solvent or diluent is used, it may be separated from the alkaline aqueous solution of the sulphonic acid salt of the alkyl hydroxy aromatic compound which results upon diluting the sulphonation mass with water and neutralizing. As sulphonation assistants there may be employed the lower organic acids and/or their anhydrides, as for example, acetic acid, acetic anhydride, etc.

The sulphonation may be carried out with the aid of heating or cooling, as required, depending upon the ease of sulphonation of the alkyl hydroxy aromatic compound and the sulphonating power of the sulphonating agents. The sulphonation of the alkyl hydroxy aromatic compound may be carried out to an extent such that mainly one, or more or less than one, sulphonic acid group is present in the final product (based on the alkyl hydroxy aromatic compound), it depending upon the properties desired of the final product, as will appear more fully hereinafter.

The sulphonated aromatic compounds may be employed in the form of their free sulphonic acids or in the form of salts. They are preferably employed in the form of salts of metals (as for example, of the alkali metals) or of organic bases, or of ammonia, etc. The salts may be obtained in any suitable manner; for example, by reacting the sulphonated product, either in the crude form resulting from the sulphonation or in a purified form, with a metal oxide or hydroxide, ammonia or an organic base, or of a suitable salt of one of these, in an amount adapted to form a neutral product. Among the bases, oxides and salts which may be combined with the sulphonated products to produce salts are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; di-amino propanol; ethylenediamine; triethylene tetramine; etc.

The reaction mixtures resulting from the sulphonation of the alkyl hydroxy aromatic compound may also be directly employed for the formation of mixed products, as for example, mixtures of salts of the alkyl hydroxy aromatic sulphonic acid and other acids present in said reaction mixtures, which mixtures of salts are also useful as such in accordance with the present invention. Thus, the sulphonation reaction mixture resulting from the treatment of the alkyl hydroxy compound with an amount of sulphonating agent in excess of that theoretically required to effect the desired degree of sulphonation may be treated with a suitable inorganic or organic base or basic salt (as for example, one of those mentioned) and the resulting mixture of the salt of the sulphonated alkyl hydroxy aromatic compound and the inorganic salt (as for example, sodium sulphate) may be jointly isolated from the reaction mixture and employed as such. If it is desired to produce a salt of the sulphonated alkyl hydroxy aromatic compound in a form substantially free from inorganic salts (for example, inorganic sulphates) this may be accomplished by taking advantage of the solubility of the salts of the sulphonated products in alcohol and other organic solvents. Thus a mixture of a salt of the sulphonated product and an inorganic sulphate may be extracted with alcohol, and the resulting extract may be evaporated to leave a residue of the purified salt of the sulphonated product.

The sulphonated products in the form of metallic salts or salts of inorganic bases are usually yellowish to white, friable solids; and in the form of salts of organic bases vary from viscous oils to semi-solids to solids. In general, the salts are readily soluble in water and in aqueous (neutral, acid or alkaline) solutions to form solutions which are faintly colored brown or yellow, which are of a soapy nature, and foam readily. Certain of the salts, such as the salts of organic polyamines, are oils which generally are insoluble in water but soluble in organic solvents (as for example, alcohol, benzene, gasoline, etc.) and in aqueous solutions of alkalis (presumably by conversion to the salts of the alkalis).

The sulphonated products may be dried in any suitable manner; as for example, in pans in shelf, atmospheric or vacuum driers; in vacuum pan or vacuum rotary driers; on atmospheric or vacuum drum driers; in spray driers; etc. The particular type of drier employed will obviously be selected with a view to the physical nature and chemical stability of the particular product. Preferably the sulphonates derived from organic bases are dried under vacuum conditions.

The invention will be illustrated by the following specific examples. It will be realized by those skilled in the art that the invention is not limited thereto, however, except as indicated in the appended patent claims. The parts are by weight.

EXAMPLE 1.—Decyl phenol 100 parts of phenol, 100 parts of diamylene (decylene), and 100 parts of zinc chloride are mixed and heated with agitation under refluxing conditions at a temperature of about 160° C. for a period of 5 hours, or until the reaction is practically complete. The product is cooled, diluted and washed with water till reasonably free of acid. The crude decyl phenol so obtained is a brownish oil. It is distilled in vacuo, and the fraction of distillate boiling between 150° and 200° C. at 15 mm. pressure is collected separately. It is a faintly colored to white oil; is insoluble in water; is soluble in gasoline, alcohol and other organic solvents; forms an unstable sodium salt with caustic soda, which is soluble in an alcohol-water mixture; and consists chiefly of a decyl phenol having the probable formula:

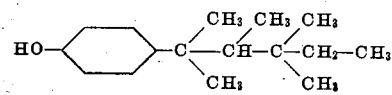

EXAMPLE 2.—Decyl amyl phenol 140 parts of diamylene and 164 parts of p-tertiary-amyl phenol are agitated at 15° to 20° C. while 100 parts of 66° Bé. sulphuric acid are added over a period of one hour. The mix is heated slowly to 40° C. for one hour, thereafter to 60° C. and held for 2 hours, then to 70° to 80° C. and held for four hours. The mass is poured into ice water, the separated oil is washed reasonably free of acid, and fractionally distilled under vacuo. The distillate boiling between 207° and 217° C. at 20 mm. mercury pressure is collected as a faintly colored to water white oil, insoluble in water. It consists mainly of decyl amyl phenol with the probable formula:

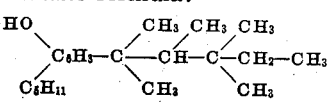

Example 3.—Decyl phenol sodium sulphonate

To 100 parts of purified decyl phenol (obtained as described in Example 1) kept rapidly agitating, 120 parts by weight of sulphuric acid monohydrate (100% $H_2SO_4$) are added slowly with temperature of the mixture so controlled that half the acid is added when the temperature reaches 75° to 80° C. The remainder of the acid is added with the temperature held to the end of the addition at 75° to 80° C. The mixture is agitated at this temperature until a sample is completely soluble in water and does not precipitate calcium salts from a soluble calcium salt solution containing the equivalent of 0.224 gram calcium oxide per liter. The sulphonation mix is poured into water, diluted to a final volume of 450 to 600 parts, and made neutral (for example, to delta paper, Congo paper, brilliant yellow, or brom-cresol-blue) with alkali, for example, caustic soda, or potash or their equivalents. The neutral solution is evaporated to dryness. If desired, the neutral solution can be clarified by filtration before being evaporated to dryness. The product thus obtained (which will hereinafter be referred to as a decyl phenol sulphonate) is a mixture of which the chief component is an alkyl phenol sulphonate having the probable formula:

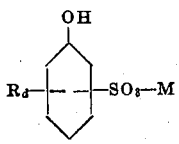

wherein $R_d$ represents the decyl radical, and M represents an alkali metal or equivalent derived from the base used for neutralization. In the form of the alkali metal, alkaline earth metal and ammonium salts it is a faintly colored, light brown to white, friable solid, readily reduced to a comminuted or powdery form (resembling powdered soap) and readily soluble in water. The salts derived from organic bases, e. g. ethylamine, pyridine, etc. are solids or liquids. Aqueous solutions of said salts foam readily and generally behave like soaps. The said salts do not precipitate lime from aqueous solutions of soluble calcium salts; they behave like tanning agents in that they precipitate glue and gelatin from aqueous solutions; they are soluble in acid, neutral and alkaline aqueous solutions; and they are strong hydrotropic substances, that is, possessing the quality of effecting solution in water of water-insoluble liquids and solids.

Example 4

The sulphonation mass is prepared, diluted, neutralized, and filtered as described in Example 3. The neutralized solution of the sulphonic acid is treated with such an amount of alcohol that the resulting alcohol solution in water contains more than 50% alcohol. The solution is filtered to remove precipitated impurities which are mostly inorganic salts, and the filtrate containing the sulphonate is evaporated to dryness to yield the dry sulphonate practically free from inorganic salts. The product which is similar to that obtained in Example 3 is suitable for use in organic solvents as a cleaning composition and is an excellent emulsifier. It can be used as a detergent in aqueous solution, but for best results an electrolyte is preferably employed in conjunction therewith.

Instead of adding alcohol to the dilution mass, the dry crude sulphonate may be dissolved in a small amount of water, the solution repeatedly extracted with alcohol, and the alcohol extracts combined, filtered and evaporated to dryness.

The following examples illustrate the use of the products hereinbefore described. These examples are directed to the use of the mixed product resulting from the process of Example 3 in the form of the sodium salt and containing sodium sulphate and other impurities resulting from the said process. For convenience, the said mixed products is hereinafter identified as "decyl phenol sodium sulphonate". It will be understood, however, that these examples are merely illustrative and that any of the other sulphonated products herein described may be similarly employed. The parts are by weight.

Example 5

1 part of decyl phenol sodium sulphonate is mixed with 1 part of common salt and dissolved in 100 parts of water. The resulting solution is a cleanser for soiled wool or other textile materials and may be applied in any convenient or chosen manner.

Any other sulphonate or mixture of sulphonates disclosed herein may be similarly employed. The sulphonates which are particularly effective are those derived from alkyl phenols containing not more than 2 (preferably 1) long chain alkyl groups, the said alkyl group containing at least 7 and preferably at least 9 carbon atoms.

Example 6

1 part of decyl phenol sodium sulphonate is dissolved in 100 parts of water at room temperature. A one-inch square of rabbit-hair hat felt about $\frac{1}{32}$ inch thick is wetted by the solution in 70 seconds.

It will be realized by those skilled in the art that changes may be made in the products, and in the processes of preparing and using them, hereinbefore described, without departing from the scope of the invention.

Thus, the sulphonated alkyl hydroxy aromatic compounds may be prepared in various ways from various intermediates; for example, a hydroxy aromatic compound of the type AH may be condensed with an alkylating agent adapted to substitute an alkyl group of the type R in the aromatic nucleus, and the resulting compound of the type AHR then may be sulphonated; or an alkyl ether of an aromatic compound of the type A, in which an alkyl group of the type R is linked by an oxygen atom to the aromatic nucleus, may be rearranged to the alkyl hydroxy aromatic compound and sulphonated before or after the rearrangement; or an aromatic compound of the type A which does not contain a hydroxyl group (as for example, an aromatic hydrocarbon), but which may or may not contain one or more nuclear sulphonic acid groups, may be condensed with an alkylating agent adapted to substitute an alkyl group of the type R in the aromatic nucleus, followed by sulphonation to substitute one or more sulphonic acid groups in the aromatic nucleus (if not already present), the alkylated aromatic sulphonic acid may then be fused with caustic alkali to form the corresponding alkyl hydroxy aromatic compound or the corresponding alkyl hydroxy aromatic sulphonic acid compound, and, if necessary, the product may be sulphonated; or the alkyl group R may be substituted in the aromatic nucleus in the form of a ketone by condensing the aromatic compound, hydroxy aromatic compound, aromatic sulphonic acid compound or hydroxy aromatic sulphonic acid compound with a long chain fatty acid or acid chloride (corresponding with the desired alkyl group R) in place of an alkylating agent in the processes just enumerated, and subsequently reducing the resulting ketone at any stage of the process.

In the production of the alkyl hydroxy aromatic compounds of the type AHR by condensation of an alkylating agent with a hydroxy aromatic compound of the type AH, suitable hydroxy aromatic compounds which may be employed are, for example, a phenol, a naphthol, a hydroxy heterocyclic aromatic compound, or derivatives thereof. As alkylating agents there may be employed non-aromatic alcohols (as for example, straight-chain, primary monohydric alcohols; straight-chain, secondary monohydric alcohols; branched-chain primary alcohols; branched-chain secondary alcohols; tertiary alcohols of all types, etc.), olefine hydrocarbons containing straight- or branched-chains and containing one or more double bonds which may be variously located in the hydrocarbon, halogen derivatives of the hydrocarbons (as for example, chlorides or bromides of the saturated and unsaturated hydrocarbons of the aliphatic class), etc., and derivatives of all of these, all containing at least 9 carbon atoms in the alkyl chain. As condensing agents there may be employed anhydrous zinc chloride, anhydrous aluminum chloride, anhydrous antimonic chloride, anhydrous ferric chloride, zinc, sulphuric acid (66° Bé., monohydrate, oleum), etc. The particular condensing agent and conditions employed vary somewhat with the alkylating agent employed. Preferably the proportion of alkylating agent employed with respect to the alkyl-hydroxy aromatic compound is such that not more than two of the said alkyl radicals of the type represented by R in the foregoing formula are contained in the resulting alkyl hydroxy aromatic compound, and preferably only one. Thus, at least 1.25 mols of hydroxy aromatic compound per mol of alkylating agent is preferably employed in the condensation. A ratio as low as 1 to 1 may be employed, but the yield of the resulting alkyl hydroxy aromatic compound containing one long alkyl group will be less. Further, the amount of condensing agent employed may vary over a wide range. For example, in using zinc chloride as the condensing agent, much less of it is generally required in condensing an alkyl chloride with an aromatic hydroxy compound than when an alcohol is condensed with a hydroxy aromatic compound; in general, a long-chain alcohol requires about an equal weight of zinc chloride for best results, whereas a chlorinated long-chain hydrocarbon requires only about 5 to 10 per cent of its weight of zinc chloride.

The time during which the condensation reaction of the hydroxy aromatic compound and the alkylating agent may be carried out also may be varied and will depend on the nature of the alkylating agent. In general the condensation between an alcohol and a hydroxy aromatic compound is practically complete within about 3 to about 5 hours at refluxing temperature but the quality of the product appears to be improved by continuing the heating. The condensation of an alkyl chloride with a hydroxy aromatic compound is satisfactorily complete in about 1 hour at refluxing temperature or in about 3 to 6 hours at 135° C. With zinc chloride as the condensing agent, the period of heating may be extended to 16 hours or more without seriously harming the quality or decreasing the yield of the alkyl hydroxy aromatic compound.

The crude alkyl hydroxy aromatic compound resulting from the condensation is preferably purified, as for example, by distillation, and the purified compound is preferably employed for sulphonation to produce a detergent in view of the resulting superior detergent properties.

As has been indicated above, in sulphonating the alkyl hydroxy aromatic compound, an inert solvent and/or a sulphonation assistant may or may not be used. The temperature at which the sulphonation is carried out may vary within wide limits. For example, temperatures as low as about 0° C. and as high as about 140° C. may be employed. In general the more vigorous the sulphonating agent the lower is the preferred temperature. Ordinarily the completion of the sulphonation is carried out at a temperature of about 70° to about 80° C. The ratio of sulphonating agent employed to alkyl hydroxy aromatic compound also may be varied. While the preferred amounts are given in the above examples, an amount of sulphuric acid or other sulphonating agent equivalent to from 1 to about 5 parts by weight of sulphuric acid monohydrate per part by weight of the alkyl hydroxy aromatic compound may be employed.

While, as has been indicated above, various alkyl hydroxy aromatic compounds containing a nuclear hydroxyl group, one or two nuclear long-chain alkyl groups having 9 or more carbon atoms in a chain which may or may not be further substituted, and one or more sulphonic acid groups, and which may be further substituted, are included in the scope of the present invention, those compounds which are derived from a phenol of the benzene series, which contain only one nuclear alkyl group having 9 to 11 carbon atoms in a branched alkyl chain (but may contain additional lower alkyl groups), and which are sulphonated to an extent substantially corresponding with the monosulphonic acid compound, are of special importance.

The extent to which the sulphonation is carried out may vary with the individual material being sulphonated and the use to be made of the sulphonated product. In some cases, a degree of sulphonation which corresponds with a product having maximum detergent properties is not completely soluble in water to form a clear solution and/or may cause some precipitation of lime salts. On the other hand, a product which causes no precipitation of lime salts may not have maximum obtainable detergent properties. Furthermore, in some cases the degree of sulphonation may not be the same for products to be used as detergents in soft water, in hard water and in alkaline solutions. It is to be noted, however, that by the employment of an alkylated hydroxy aromatic compound which has been purified by fractional vacuum distillation, less variation in the detergent properties and precipitation of lime salts of the sulphonated product occurs than when a relatively less pure alkyl hydroxy aromatic compound is sulphonated.

It is to be noted that mixtures of two or more of the sulphonated products hereinbefore referred to may be employed. Furthermore, any of the said sulphonated products or their mixtures may be employed in connection with other hydrotropic substances; dispersing, emulsifying and/or penetrating agents; aliphatic or aromatic sulphonic acids; acid alkyl esters of sulphuric acid; sulphonation products of petroleum oil; alkyl aryl sulphonates free from a nuclear hydroxyl group; and/or their derivatives.

In addition to the above described uses of the sulphonated products of the present invention, it is noted that the said sulphonated products may be employed for a large variety of purposes wherein cleansing, penetrating, wetting, surface tension lowering, and similar action is required.

Thus the said sulphonic acids and their salts may be incorporated into compositions containing laundry and toilet soaps, sulphurized oils, hydrocarbons, alcohols, esters, alkyl amines, mixed amines, fats, oils, waxes, unguents, alkyl phenols, ketones, mineral oils, resinous substances, alkyl sulphates, organic acids of all types, inorganic acids, inorganic bases, organic bases, inorganic salts, etc.

The said sulphonates can be incorporated in compositions prepared and applied with any kind of dye or mixture of dyes, as for example, acid, basic, chrome, developing, direct, sulphur or vat dyes, or aniline black, or the so-called "ice colors," etc. They may be used in baths or preparations of any kind and used for dyeing, printing, padding, stencilling, stamping, developing or coloring fibrous material in any manner whatsoever.

In the preparation of fibrous material, compositions containing these sulphonates can be applied to increase penetration of treating solutions into the fiber and such improvement of penetrating power is had regardless of the alkaline, neutral or acid nature of the solution, and is effective in all manner of processes; such as bowking, bleaching, cleaning, carbonizing, degreasing, dry-cleaning, felting, finishing, greasing, impregnating, lubricating, lathering, laundering, mercerizing, softening, stripping, scouring, sizing, washing and wetting. In acid treating baths, as for example, in wool carbonizing baths or acid dyeing baths, the said sulphonates act as anti-acid and acid-protective agents. The detergent properties in acid solution permit for example, scouring of raw wool in an acid carbonizing bath.

The said sulphonates appear to react with silk and protect it, as for example, against staining by cotton dyes.

The said sulphonates further have the valuable property of imparting excellent, and often unusually intensive, penetrating characteristics to compositions containing them, which thereby become valuable active agents in processes for cleansing, scouring, bowking, degreasing; or in processes requiring the rapid transfer of active agents into the fiber (such as acid in carbonizing wool; dye or intermediate solutions and dispersions in dyeing, padding, printing, etc.; latex solutions in impregnating cloth; caustic soda in mercerizing; hypochlorite in bleaching; hydrosulphite in stripping; etc.).

Compositions containing the said sulphonates for finishing, lubricating, sizing, and soaping fibrous material are effective and rapid in action. They inhibit the deposition of insoluble soaps in baths which contain hard water and soap, and sometimes completely prevent precipitation of lime soaps.

The said sulphonates may also be employed to permit more uniform precipitation of artificial silk in a precipitating bath, better washing of nitro cellulose in a steeping and washing bath, more uniform lubrication of threads by a spinning bath, greater penetration and cleansing with a dry cleaning bath. Fibrous materials impregnated with a solution of the said sulphonates have a marked, increased inbibing or absorption power for the varied treating solutions and compositions commonly applied to such material.

The said sulphonates are valuable ingredients in electrolytic baths inducing by their presence more uniform depositions from electrolytes.

The said sulphonates are also valuable stabilizing agents for diazonium and nitroso preparations, and prevent their rapid decomposition. They combine readily with diazo preparations of this type to precipitate stable compounds capable of being dried and handled without fear of rapid decomposition. They are accordingly valuable ingredients in compositions containing diazonium or nitroso preparations applied to fibrous materials by dyeing, printing, padding and generally related processes.

The said sulphonates possess the valuable property of imparting to their solutions strong foaming and frothing qualities. They are valuable components of compositions and processes requiring frothing or foaming, as for example, in dyeing textile materials by foam methods; in protecting oxidizable baths (e. g. reduced dye baths) against oxidation by air; in the separation of minerals by flotation; in aerating liquids and washing of gases; and in fire extinguishing preparations.

The wetting and penetrating power imparted to compositions containing the said sulphonates makes them valuable components of cosmetic preparations such as hair washes, dentifrices, cleansers, toilet soaps, mouth washes; as well as of insecticides, fungicides, etc. to which preparations they impart strong penetrating and wetting properties which insure intimate contact with surfaces to which the preparations are applied.

They are valuable components of compositions and processes applied to the production of sterile products such as sterile starch, glue, wood, gelatine, etc.

In all cases where desired, they may be incorporated in compositions containing protective colloids, such as glue, soap and/or gelatine when used under conditions which do not cause precipitation thereof.

The said sulphonates also possess the property of altering ultra-violet light in the direction of the visible spectrum. Accordingly, they can be incorporated in compositions, particularly in organic solvents in which they are soluble, to be applied for the purpose of preventing sunburn, or other objectionable action of ultra violet light. They may be applied to convert ultra violet light to visible light, and thus serve as dyes or pigments for substances to be viewed under ultra-violet light.

The said sulphonates, by their power to impart reduced surface tension to compositions containing them, are valuable agents in processes for breaking oil emulsions.

The free sulphonic acids are effective and valuable fat-saponifying agents.

The said sulphonates may also be employed as intermediates for the preparation of other chemical compounds. Inasmuch as they contain a phenolic hydroxyl group they may be employed as coupling components for azo dyes.

Compositions containing these sulphonates in solution are not confined to such as are made with and contain water as the essential liquid medium. Water is preferred, but may be replaced by alcohol or other solvent as required or found desirable and in which the sulphonate is soluble.

In addition to their use as intermediates for the production of sulphonated products, the alkylated hydroxy aromatic compounds of the type AHR herein described may be employed as detergents in the form of solutions in alcohol-water mixtures containing caustic alkali; as insecticides; as wetting agents in conjunction with emulsifying agents; as solvents; as intermediates for the production of resins of all kinds in which phenols are reacted with resin-forming ingredients of various types; as plasticizers for resinous products, cellulose plastics, and other synthetic and natural plastics of all types; as intermediates for the production of azo dyestuffs useful for the dyeing of cellulose esters and ethers, and/or soluble in organic solvents.

It will be understood that, in general, the alkyl hydroxy aromatic sulphonates prepared and used in accordance with the present invention differ from each other with respect to their wetting, emulsifying, detergent and other properties, and that these properties are more or less altered and/or differently affected by the presence therewith of inorganic salts and other products and/or impurities. For example, the detergent powers of one alkyl hydroxy aromatic sulphonate may be relatively greater than that of another alkyl hydroxy aromatic sulphonate, while the wetting powers are relatively less and the presence of sodium sulphate may affect or alter the detergent powers or properties more than it does the wetting properties. It is evident, therefore, that in the uses of the alkyl hydroxy aromatic sulphonates these differences in properties should be taken ordinarily into account provided comparable results are to be obtained as to any particular use.

I claim:

1. An alkyl hydroxy aromatic sulphonate in which the alkyl, hydroxy, and sulphonate groups are nuclear substituents and the alkyl group contains at least 9 carbon atoms.

2. An alkyl hydroxy aromatic sulphonate in which the alkyl, hydroxy, and sulphonate groups are nuclear substituents and the alkyl group contains 9 to 11 carbon atoms.

3. An alkyl hydroxy aromatic sulphonate in which the alkyl, hydroxy, and sulphonate groups are nuclear substituents and the alkyl group contains 9 to 11 carbon atoms in a branched carbon chain.

4. An alkyl hydroxy aromatic sulphonate in which the alkyl, hydroxy, and sulphonate groups are nuclear substituents and the alkyl group is an open chain hydrocarbon radical containing 9 to 11 carbon atoms and linked to the aromatic nucleus by an intermediate carbon atom of the chain.

5. A liquid composition for the treatment of textile material comprising essentially an aqueous solution of an alkyl hydroxy aromatic sulphonate in which the alkyl, hydroxy, and sulphonate groups are nuclear substituents, and the alkyl group contains at least 9 carbon atoms.

6. A liquid composition for the treatment of textile material comprising essentially an aqueous solution of a sulphonated alkyl phenol compound which, in the form of the free sulphonic acid, corresponds with the formula AHRS; wherein AH represents a phenol of the benzene series, R represents an alkyl group directly linked to a carbon atom of the phenol nucleus and containing at least 9 carbon atoms, and S represents a sulphonic acid group.

7. A sulphonated alkyl phenol compound which, in the form of the free sulphonic acid, corresponds with the formula AHRS; wherein AH represents a phenol of the benzene series, R represents an alkyl group directly linked to a carbon atom of the phenol nucleus and containing at least 9 carbon atoms, and S represents a sulphonic acid group.

8. A sulphonated alkyl phenol compound which, in the form of the free sulphonic acid, corresponds with the formula AHRS; wherein AH represents a phenol of the benzene series, R represents an alkyl hydrocarbon group directly linked to a carbon atom of the phenol nucleus and containing at least 9 carbon atoms in a branched carbon chain, and S represents a sulphonic acid group.

9. A sulphonated alkyl phenol compound which, in the form of the free sulphonic acid, corresponds with the formula AHRS; wherein AH represents a phenol of the benzene series, R represents an alkyl hydrocarbon group directly linked to a carbon atom of the phenol nucleus and containing 9 to 11 carbon atoms in a branched carbon chain, and S represents a sulphonic acid group.

10. A liquid composition for the treatment of textile material comprising essentially water, calcium in the form of a salt, and an alkyl hydroxy aromatic sulphonate in which the alkyl, hydroxy, and sulphonate groups are nuclear substituents, and the alkyl group contains at least 9 carbon atoms.

11. A liquid composition for the treatment of textile material comprising essentially water, calcium in a soluble form, and a sulphonated alkyl phenol compound which, in the form of the free sulphonic acid, corresponds with the general formula AHRS; wherein AH represents a phenol of the benzene series, R represents an alkyl group directly linked to a carbon atom of the phenol nucleus and containing 9 to 11 carbon atoms, and S represents a sulphonic acid group.

12. A liquid composition for the treatment of textile material comprising essentially an acid aqueous solution of an alkyl hydroxy aromatic sulphonate in which the alkyl, hydroxy, and sulphonate groups are nuclear substituents and the alkyl group contains at least 9 carbon atoms.

13. A liquid composition for the treatment of textile material comprising essentially an acid aqueous solution of a sulphonated alkyl phenol compound which, in the form of the free sulphonic acid, corresponds with the general formula AHRS; wherein AH represents a phenol of the benzene series, R represents an alkyl group directly linked to a carbon atom of the phenol nucleus and containing 9 to 11 carbon atoms, and S represents a sulphonic acid group.

14. An alkyl hydroxy aromatic sulphonate in the form of the sodium salt in which the alkyl, hydroxy, and sulphonate groups are nuclear substituents and the alkyl group contains 9 to 11 carbon atoms.

15. An alkyl hydroxy aromatic sulphonate in the form of the sodium salt in which the alkyl, hydroxy, and sulphonate groups are nuclear substituents and the alkyl group is an open chain hydrocarbon radical containing 9 to 11 carbon atoms.

16. An alkyl hydroxy aromatic sulphonate in which the alkyl, hydroxy, and sulphonate groups are nuclear substituents and the alkyl group contains 10 carbon atoms.

17. An alkyl hydroxy aromatic sulphonate in which the alkyl, hydroxy, and sulphonate groups are nuclear substituents and the alkyl group is a hydrocarbon radical containing 10 carbon atoms.

18. An alkyl hydroxy aromatic sulphonate in which the alkyl, hydroxy, and sulphonate groups are nuclear substituents and the alkyl group is an open chain hydrocarbon radical containing 10 carbon atoms and linked to the aromatic nucleus by an intermediate carbon atom of the chain.

19. An alkyl phenol sulphonate of the benzene series in which the alkyl, hydroxy, and sulphonate groups are nuclear substituents and the alkyl group is an open chain hydrocarbon radical containing 10 carbon atoms and linked to the aromatic nucleus by an intermediate carbon atom of the chain.

20. A sulphonated mono-alkylated hydroxy benzene containing an alkyl group of 10 carbon atoms.

21. A nuclear sulphonated mono-alkylated hydroxy benzene containing a nuclear saturated alkyl group of at least 9 carbon atoms.

22. An alkyl hydroxy aromatic mono-sulphonate in which the alkyl, hydroxy and sulphonate groups are nuclear substituents and the alkyl groups contain at least 9 carbon atoms.

23. A mono-sulphonated alkyl phenol compound which, in the form of the free sulphonic acid, corresponds with the formula AHRS; wherein AH represents a phenol of the benzene series, R represents an alkyl group directly linked to a carbon atom of the phenol nucleus and containing at least 9 carbon atoms, and S represents a sulphonic acid group.

24. A mono-sulphonated alkyl phenol compound which, in the form of the free sulphonic acid, corresponds with the formula AHRS; wherein AH represents a phenol of the benzene series, R represents an alkyl hydrocarbon group directly linked to a carbon atom of the phenol nucleus and containing 9 to 11 carbon atoms in a branched carbon chain, and S represents a sulphonic acid group.

25. A nuclear mono-sulphonated mono-alkylated hydroxy benzene containing a nuclear alkyl group of at least 9 carbon atoms.

26. A mono-alkyl hydroxy mono-sulphonate in which the alkyl, hydroxy, and sulphonate groups are nuclear substituents and the alkyl group is an open chain hydrocarbon radical containing 9 to 11 carbon atoms and linked to the aromatic nucleus by an intermediate carbon atom of the chain.

27. A mono-sulphonated mono-alkylated hydroxy benzene containing an alkyl group of 10 carbon atoms.

ANTHONY M. SCHWARTZ.

CERTIFICATE OF CORRECTION.

Patent No. 2,205,949. June 25, 1940.

ANTHONY M. SCHWARTZ.

It is hereby certified that error appears in the printed specification of the above numbered patent requiring correction as follows: Page 7, second column, line 21, claim 26, after the word "hydroxy" insert --aromatic--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.